(12) United States Patent
McNair

(10) Patent No.: US 8,775,624 B2
(45) Date of Patent: Jul. 8, 2014

(54) LOAD-BALANCING AND TECHNOLOGY SHARING USING LEMPEL-ZIV COMPLEXITY TO SELECT OPTIMAL CLIENT-SETS

(75) Inventor: Douglas S. McNair, Leawood, KS (US)

(73) Assignee: Cerner Innovation, Inc., Overland Park, KS (US)

( * ) Notice: Subject to any disclaimer, the term of this patent is extended or adjusted under 35 U.S.C. 154(b) by 653 days.

(21) Appl. No.: 12/649,957

(22) Filed: Dec. 30, 2009

(65) Prior Publication Data

US 2010/0169490 A1 Jul. 1, 2010

Related U.S. Application Data

(60) Provisional application No. 61/141,818, filed on Dec. 31, 2008.

(51) Int. Cl.
*G06F 15/173* (2006.01)
(52) U.S. Cl.
USPC ................... 709/226; 709/217; 709/224
(58) Field of Classification Search
USPC ..................... 709/217, 224, 226
See application file for complete search history.

(56) References Cited

U.S. PATENT DOCUMENTS

| | | | |
|---|---|---|---|
| 7,290,028 B2 | 10/2007 | Brabson et al. | |
| 2004/0267897 A1* | 12/2004 | Hill et al. | 709/217 |
| 2005/0021530 A1* | 1/2005 | Garg et al. | 707/100 |
| 2005/0165925 A1* | 7/2005 | Dan et al. | 709/224 |
| 2008/0189418 A1 | 8/2008 | Kimbrel et al. | |
| 2009/0300210 A1* | 12/2009 | Ferris | 709/235 |

OTHER PUBLICATIONS

Haiying Shen, A P2P intelligent resource discovery mechanism in Internet-based distributed systems, Jun. 27, 2008, J. Parallel Distributed Computing; pp. 197-209.*
Alessandro Bevilacqua, A Dynamic Load Balancing Method on a Hetergeneous Cluster of Workstations, Jan. 25, 1999, University of Bologna, pp. 1-10.*
António Nogueira et al., Fitting Self-Similar Traffic by a Superposition of MMPPs Modeling the Distribution at Multiple Time Scales, Paper, 2004, pp. 1-11.
Jianbo Gao et al., Superposition of Multiplicative Traffic Streams, IEEE International Conference on Communications, 2000, pp. 816-820, vol. 2.
H. Shachnai et al., On Two Class-Constrained Versions of the Multiple Knapsack Problem, Algorithmica, 2001, pp. 442-467, vol. 29.

* cited by examiner

*Primary Examiner* — Glenford Madamba
(74) *Attorney, Agent, or Firm* — Jones Robb PLLC

(57) ABSTRACT

Optimal assignment of clients to client-sets, resources to resource-sets, and client-sets to resource-sets in a server farm allows for periodic re-balancing of the load as client usership and concurrent-user activity fluctuate. Unique combinations of clients are generated as candidate client-sets, and historical load measurements for clients in each candidate client-set are summed. Summed loads for the candidate client-sets are compared against available resources of resource-sets. An objective function is employed to identify optimal assignment of clients to client-sets, resources to resource-sets, and client-sets to resource-sets.

14 Claims, 3 Drawing Sheets

LOAD-BALANCING AND TECHNOLOGY SHARING USING LEMPEL-ZIV COMPLEXITY TO SELECT OPTIMAL CLIENT-SETS

CROSS-REFERENCE TO RELATED APPLICATIONS

This application claims the benefit of U.S. Provisional Application No. 61/141,818, filed Dec. 31, 2008, which is herein incorporated by reference in its entirety.

BACKGROUND

An optimization problem models the dynamic placement of remotely-hosted operations (RHO) of software applications on servers under conditions of heavy simultaneous resource requirements. Some resource requirements are dependent on the loads associated with the software applications and their users' actions while other resource requirements are independent of moment-to-moment loads. The demand (load) for applications changes over time and the goal is to satisfy all the demand while changing the solution (assignment of applications to servers) as little as possible from period to period. Dynamically partitioning a set of resources among a plurality of client organization licensees and their respective users is desirable and valuable, to provide economies-of-scale through resource-sharing in such a manner that the total cost of ownership (TCO) is as low as possible for the client licensees whose business activity is hosted on such RHO systems, communications switches, and server farms.

Selection of optimal client-sets such that the sets optimally utilize the available capacity of the RHO server resources allocated to each set is related to the problems of data-compression and digital steganography. In the former problem, the aim is to losslessly encode the information into the minimum number of digital bits as possible. In the latter problem, the aim is to reversibly obscure one or more confidential digital signatures or patterns of information by encoding their admixture with other host information or digital image as an intermediate-complexity composite image. The identification of optimal client-sets that yield server efficient, balanced load assignments on the minimum server resources is an analogous process of discovering admixtures of load that effectively obscure each individual client's load timeseries by immersion in the pool of activity of all clients in the client-set.

Such long timescale load-balancing is not only desirable for improving server farm availability, scalability, manageability, and security. It is also desirable for improving cost-efficiency and affordability, by minimizing TCO through large-scale resource-sharing. While state-less load-balancing is simple, 'state-aware' load-balancing is far more powerful for preventing overloads while at the same time maximizing the utilization of allocated resources.

Large-scale 'grid' computing is capable of delivering reduced costs through sharing of resources, spreading the use of large-capacity resources among many client organizations. Those practiced in the art currently identify candidate aggregate sets whose loads are 'complementary' to each other and who thereby, in aggregate, present modest loads to the computing resources that are assigned to the sets in an ad hoc fashion. Despite the fact that there are a variety of algorithms and systems for short timescale load-balancing of generic application loads presented to ASP server farms, to date there have been no methods for: consistently, predictably, and reliably identifying aggregate load-sets that have optimal resource utilization and performance properties on a longer timescale of days to months; nor for rank-ordering alternative aggregate sets of clients and applications that are nonfungible (nongeneric, on account of differing business-rules requirements) according to a numerical figure-of-merit valid for long timescales, for the purpose of making optimal assignments to dedicated resource-sets.

Combinations or aggregate loads whose peaks in CPU or memory or I/O read-write rates are additive and occur at the same times and days-of-week should be avoided, insofar as inter-client contention for the finite resources will make the amount of resources needed to deliver a given level of performance according to contract worse-than-linearly greater (as an aggregated computational load) than the amount of resources for each of them to be hosted individually. Furthermore, combinations whose valleys or troughs in CPU or memory or I/O occur at the same times should also be avoided, or the system-idle unused capacity and cost-effectiveness (and total cost of ownership, TCO) for the aggregate will likewise be worse for such clients combined together than had they been hosted individually on separate (smaller-capacity) equipment.

The rate of dataflow in computer networks between hosts and clients in RHO and ASP systems depends upon many parameters. Some of these parameters can be tied to the provision of telco, router, firewall, network, CPU, memory, disk, and other resources. These provisioned resources can be measured and system performance reports can be generated to determine whether the parameters are in compliance with a negotiated Service Level Agreement (SLA), or whether existing allocations present risks of near-term violation of the terms of the SLA. An SLA between a service provider and a client organization defines the expected and acceptable properties of the services, typically in the context of providing Internet-based application services that are hosted by the remote-hosting organization. The SLA sets forth the means and metric whereby specified performance goals can be measured, by defining the performance metrics and the corresponding goals and level-of-service guarantees. By monitoring compliance with SLA limits, an RHO service provider can avoid the costly problems that result from disappointing users or hosted client organizations.

RHO operations can be monitored and measured using standard techniques such as Route Monitor (RMON) and IBM WEBSPHERE, TIVOLI, or other available monitoring software. Application-layer parameters such as transactions-per-second throughput, latency (waiting times) and end-to-end round-trip time are influenced by conditions such as CPU availability (periods of processing overload), and secondary resource availability (e.g., database I/O bandwidth). Furthermore, some network monitors monitor the number of concurrent network connections that can be opened on each server and the number of concurrent users who have sessions active at each point in time, logging such information to a monitoring database.

It is generally known that an SLA can be defined to guarantee the dataflow rates and system availability in remotely-hosted RHO systems. Resource capacity (bandwidth) is allocated or assigned to the flows by the managers of the systems so as best to satisfy the SLA parameters. SLA-based allocations are intended to guarantee the requested bandwidth from the client to the server and back.

It is further known by those skilled in the art that individual host computers can create logs of each client request and each moment of system resources' utilization. These log files are stored on disk in the host computers. The log files contain 'raw,' unformatted information about each transaction or client request, and may be provided in diverse, incompatible formats.

One major disadvantage of the prior art is that existing monitoring/logging mechanisms are necessarily tied to particular machines, even though a user transaction may be serviced by any of several different machines. Similarly, reporting on the performance related to some particular software application or service is difficult when the same content can be served by any one of several different machines.

One example of prior art is the SLA implementation disclosed in U.S. Pat. No. 5,893,905, issued Apr. 13, 1999. In that system, as applied to a scheduled computer processing job environment, a monitoring center automatically retrieves job exception data, job run data, and clocktime data from multiple computer subsystems, each of which is running a monitoring data collection program module. The retrieved data are stored in appropriate databases for each type of data collected. A jobflow table, according to the daily SLAs, is also stored in the system, corresponding to a set of application programs and scripts executed. A 'periodic data analysis process' determines whether jobs were run in a timely fashion, or if errors have occurred. If delayed processing is detected, the system determines whether the result will negatively affect contractual conformity with the SLA. If a problem is detected, then system management personnel are alerted with reports identifying the variances that may impact an SLA, and which SLA is in jeopardy, so that operations personnel can take additional manual steps, such as reallocating one or more clients or applications to a different set of resources.

Each server machine can run some finite number of application processes, depending on the resource requirements of those software applications and the particular amounts of resources available on the server. The use of these applications processes is through request messages, to which there may be replies. The collection of servers is known as a cluster. Request messages for a particular application are split among all instances of that application on a resource-set that is allocated and accessible to an authorized client-set. Therefore, when application instances use different servers, the size of a cluster directly impacts the amount of load that the cluster can sustain without performance degradation.

When the size of a cluster is insufficient, the application users experience performance degradation or failures, resulting in the violation of Service Level Agreements (SLA). Today, to avoid SLA violation, application providers must overprovision the number of application instances to handle peak loads, resulting non-optimal total cost of ownership (TCO). This results in cost-inefficient (low) resource utilization during normal operation conditions.

Dynamic allocation techniques available today (e.g., IBM TIVOLI INTELLIGENT THINKDYNAMICS ORCHESTRATOR), assign applications to server clusters. Then, servers are reallocated among clusters based on the offered load.

The prior art has several limitations. (1) When only one application can be assigned to a cluster at any given time, the granularity of resource allocation is coarse. The approach is wasteful when an application demand is not sufficient to utilize an entire server. (2) They are practicable only for generic applications (and generic business-rules that do not differ by user or by client). (3) They are valid and effective only for load-balancing on short timescales, ranging from milliseconds to a few days and are unable to optimize allocations for load-balancing, cost-effectiveness (TCO), or SLA compliance assurance on longer timescales (weeks to months). (4) In the process of server reallocation from one application to another, the old application has to be uninstalled, the server reconfigured, and the new application has to be installed. Usually, network configuration also needs to change. This reconfiguration process may be time-consuming and therefore cannot be performed frequently, which results in lower responsiveness to load changes, or greater incidence of SLA noncompliance, or both. (5) Source traffic streams as well as aggregated traffic flows often exhibit long-range-dependent (LRD) properties that are time-dependent. The superposition of a finite number of multiplicative multifractal traffic streams results in another multifractal stream, but prior art does not provide a practicable method or system for predicting the properties of the resulting multifractal stream and the feasibility of supporting the workload associated with the aggregated steam on the available computing resources while conforming to the agreed SLA performance parameters with a high degree of statistical confidence.

Similar problems have been studied in theoretical optimization literature. The special case of problems with uniform memory requirements was studied by H. Schachnai and T. Tamir (2001), where some approximation algorithms were suggested. Related optimization problems include bin packing, multiple knapsack and multi-dimensional knapsack.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are directed to the optimization of dynamic allocation of computing client organizations and userships to remote-hosting resources so as to satisfy the aggregate computational load and the provisions of SLA agreements while optimizing economies-of-scale and while changing the period-to-period allocations of clients, applications, and resources as little as possible. Source traffic streams as well as aggregated traffic flows often exhibit long-range-dependent (LRD) properties. Each traffic stream component can be modeled mathematically as a multiplicative multifractal process. The superposition of a finite number of multiplicative multifractal traffic streams as a virtual client-set results in another multifractal stream. This property makes the multifractal traffic model a versatile tool in modeling traffic streams in computer communication networks. There, a server resource is loaded by a traffic flow resulting from the superposition of source streams and aggregated LRD (and other) streams. The structure and the burstiness of the superimposed process is mathematically predictable, and the salient properties of each virtual client-set and its associated multifractal process stream are summarized by its Lempel-Ziv Complexity.

Embodiments of the present invention address the problem of automatic, algorithm-guided optimal assignment of clients to client-sets, resources to resource-sets, and client-sets to resource-sets in a server farm, to allow for periodic re-balancing of the load as client usership and concurrent-user activity fluctuate. Embodiments reliably predict and rank-order feasible client-set/resource-set combinations, based on a synthesis of historical load measurements for each client, determining which allocations would optimally prevent (contract-violating) peaks and delays and service-denials and at the same time optimally put as many clients as possible into each aggregate, such that the utilization of resources will be high enough to minimize the cost to the clients, the TCO to provide the services utilized by the clients.

In general, such an allocation would not be performed just once, leaving the allocations static. Clients' service mix changes year-to-year and seasonally. Clients add and subtract staff (and, hence, concurrent users), based on competitive pressures in their local healthcare market and catchment area. Each client's production application solution mix evolves over time and, with each solution go-live', there are dramatic changes in that client's loads impinging on the RHO server farm.

Therefore, some embodiments of this invention entail continuously measuring each client's activity and calculating rebalanced optimal allocations on a frequent basis (e.g., minute-wise averages through the course of each day)—and making (re-)allocation decisions and changes frequently. The (re-)allocation decisions may be taken according to a schedule (synchronously; periodically; e.g., quarterly), or on an event-driven/performance-degradation-driven basis (asynchronously; aperiodically).

Web servers comprising an RHO server farm on a network are adapted for logging detailed runtime information regarding client user transactions and system performance parameters to a database, and therefore the historical-load activity measurements upon which to base such calculations are readily available for existing RHO and ASP systems. In embodiments, the system and methods disclosed herein interact with such existing databases, to collect and combine the load log files, process the combined files, and create a quantitative metric by which the quality and future performance characteristics of potential client combinations that may be entertained for the purpose of large-scale resource-sharing.

Accordingly, in one aspect, an embodiment of the present invention is directed to a method for periodic or aperiodic software application resource allocation under one or more load-dependent resource constraints by dynamically reconfiguring assignment of one or more client organizations and their associated applications and userships as distinct combinations or client-sets, to servers in a manner whereby merits of each such combination are mathematically evaluated and ranked in advance of undertaking selection of optimal assignments or allocations, the method comprising. The method includes describing a plurality of servers and a plurality of userships and applications as abstract sets of elements corresponding to the plurality of servers and a plurality of clients, users, and applications, respectively. The method also includes defining a set of possible distinct client-sets and their resource loads and a set of possible distinct configurations of resources as resource-sets having known capacities. The method further includes determining a feasibility for a given assignment of client-sets to resource-sets and determining a feasibility for distributing the users and resource load between servers in each resource-set. The method still further includes dynamically reconfiguring allocations of clients to client-sets, resources to resource-sets, and client-sets to resource-sets based on an objective function to optimize the cost-efficiency of the allocations simultaneously with insuring SLA compliance of the allocations.

In another aspect of the present invention, an embodiment is directed to a computer storage medium storing computer-useable instructions that, when used by a computing device, cause the computing device to perform a method for allocating clients to client-sets, server resources to resource-sets, and client-sets to resource-sets. The method includes generating a plurality of candidate client-sets from a plurality of clients, each candidate client-set comprising a unique combination of clients. The method also includes accessing historical resource utilization metrics for each client over a given time interval. The method further includes determining resource utilization loads for each candidate client-set over the given time interval based on the historical resource utilization metrics. The method also includes comparing the resource utilization loads for each candidate client-set against available resources to identify any time periods in which a resource utilization load would have exceeded a threshold for the available resources. The method further includes calculating a Lempel-Ziv complexity for each candidate client-set. The method still further includes selecting client-sets and allocating the selected client-sets to resource-sets based at least in part on the Lempel-Ziv complexity determined for each candidate client-set.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject utter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Figure 1:
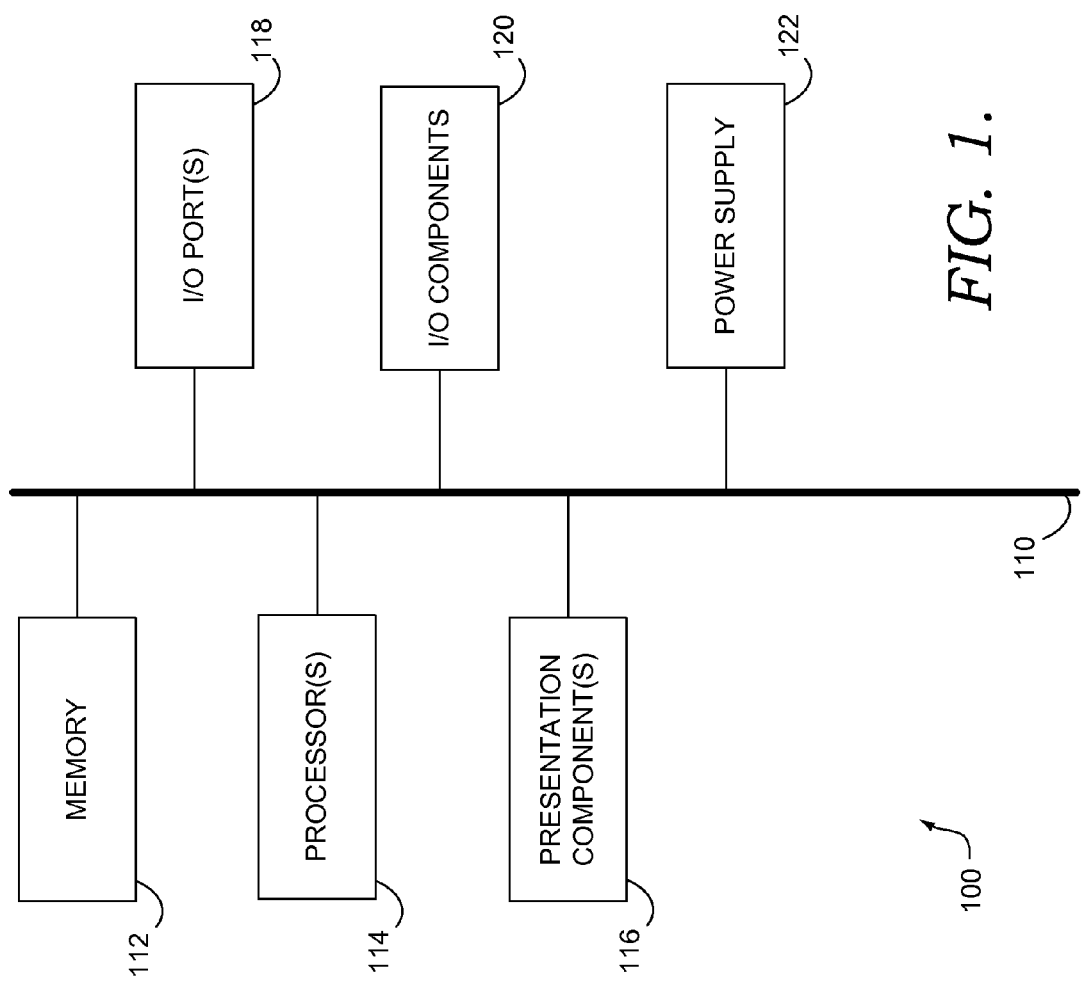
FIG. 1 is a block diagram of an exemplary computing environment suitable for use in implementing the present invention.

An exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic. RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processor that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
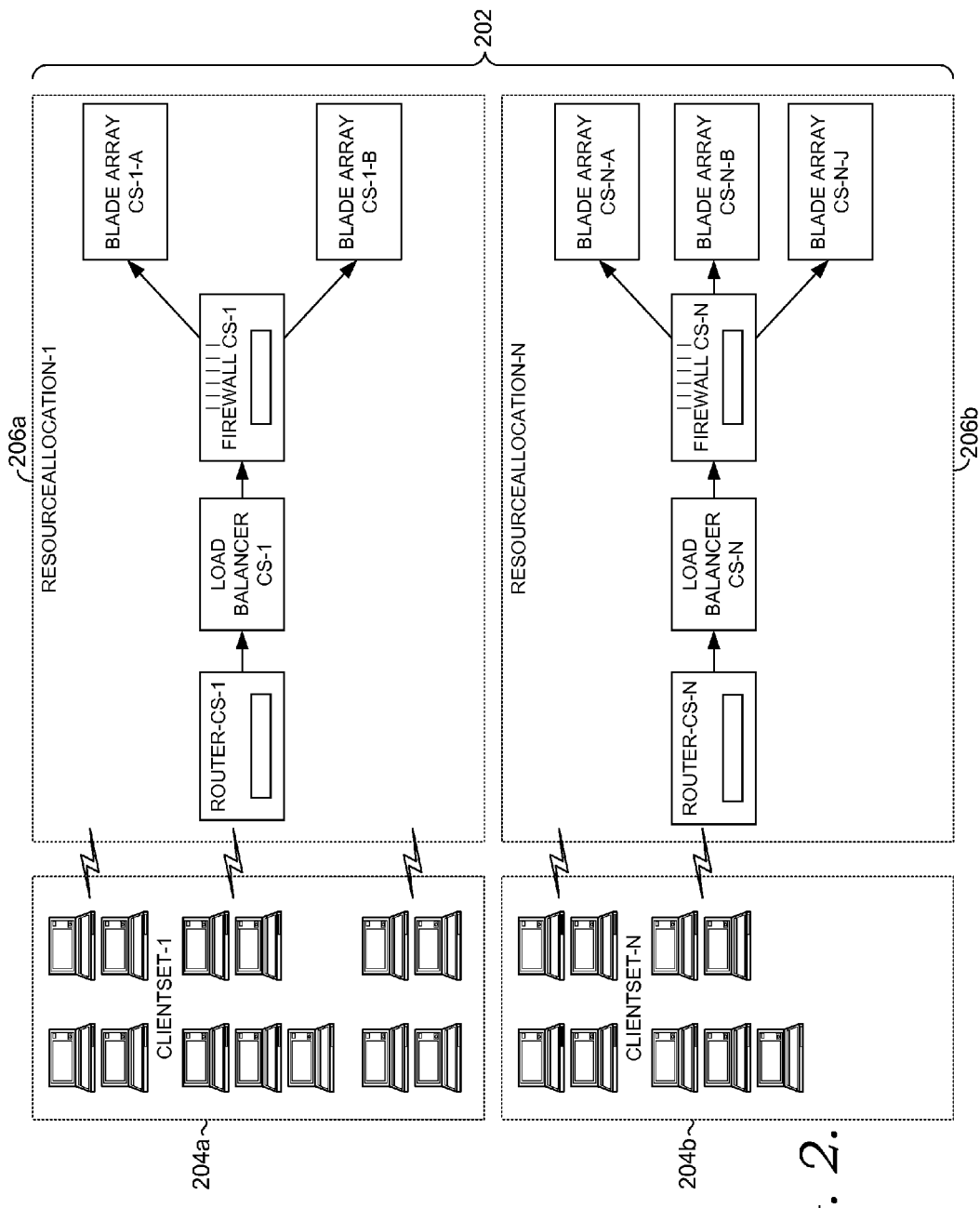
FIG. 2 is a block diagram of an exemplary system in which embodiments of the invention may be employed.

With reference now to FIG. 2, a block diagram is provided that illustrates the constitution of client-sets (e.g., client-sets 204a and 204b) and resource-sets (e.g., resource-sets 206a and 206b) and optimal client-set/resource-set allocations according to an embodiment of the present invention. In embodiments of the present invention, a network model includes a plurality of computer systems clustered into an RHO server farm 202, in which a front-end router system distributes service requests from a particular group of clients (e.g., client-set 204a or 204b) to one or more back-end servers (e.g., within resource-set 206a or 206b), a fixed subset of servers selected and dedicated from among a larger number of servers comprising the server farm 202. The front-end system receives a service request from a user who is associated with a member client organization that is part of the client-set and who is, in general, located outside the premises of the server farm. The system selects one of the back-end servers in a resource-set allocated to that client-set for the purpose of servicing the requests from this client's users, and forwards (routes) the request to the selected back-end server in the resource-set that is dedicated to the client-set to which the client affiliated with that user belongs. The selected back-end server then services the user's request, and generates any necessary response directly to the requesting user, utilizing telco and channel-switching and router and other resources that are also elements of the same resource-set. A given back-end server may be requested to process transactions destined for a plurality of 'virtual sites' that the back-end server is hosting as a surrogate for the 'hosted site' addressed in the transaction.

Each back-end server generates its own time-stamped log entry for each transaction it processes, resulting in a distributed log file in the network, continuously storing the measurements of performance parameters and statistics representing the software application load and resource consumption arising from the activity of each client-set and its usership. The individual files of the distributed log file each include information regarding username, date, time, service, server name, server IP address, client IP address, processing time, bytes sent, bytes received, disk and network I/Os performed, delay time associated with completing each service request or transaction, service status, operation, application program or script(s), and other performance parameters pertaining to the state and load impinging upon the server at the time and the context of the logged activity. Log files collected in the server farm also include a time stamp to measure the server farm transfer time, the front-end server's name, and the DNS name of the host that served each request. The information logged need not be so extensive as this; however, it is desirable to have sufficiently extensive information so as to containing the specific details used for characterizing the causes of overload conditions and reducing or preventing their recurrence in the future. The combined log files are parsed and combined, so as to enable access and summation of dutycycle (percent utilization, per time period) for each resource type over meaningful timeperiods during which monitoring and system management decisions and actions are taken.

Accordingly, one or more embodiments of the present invention seek to automatically discover and rank a plurality of feasible combinations of RHO clients that, if their computational loads were aggregated together on a shared set of servers (or, for that matter, human support resources, etc.), the combinations would represent harmonious, highly cost-efficient allocations or aggregates.

Compared to traditional techniques, embodiments of the present invention employs an objective function to provide systematic resource allocation to client loads in a remote-hosting server farm environment, in a manner that is cost-efficient and optimal on a long time horizon of days to months. In embodiments, the decision process for dynamic placement of applications under two or more simultaneous resource requirements is modeled. The demand (load) for applications changes over time and the goal is to satisfy all the demand without violating the terms of SLA agreements while minimizing the TCO and extensive sharing of large-capacity resources while changing the client-sets (assignments of clients, users, and applications to servers) as little as possible. Modeling of the decision process as an optimization problem is undertaken, and involves the mathematical complexity of bitstrings or arrays where non-zero values represent target resource utilization transgressions of candidate client-set/resource-set combinations, based on historical load timeseries data for the clients and applications comprising each client-set for previous timeperiods that have been monitored and recorded. In one embodiment, an algorithm is developed to solve this optimization problem based on the Lempel-Ziv complexity metric.

Figure 3:
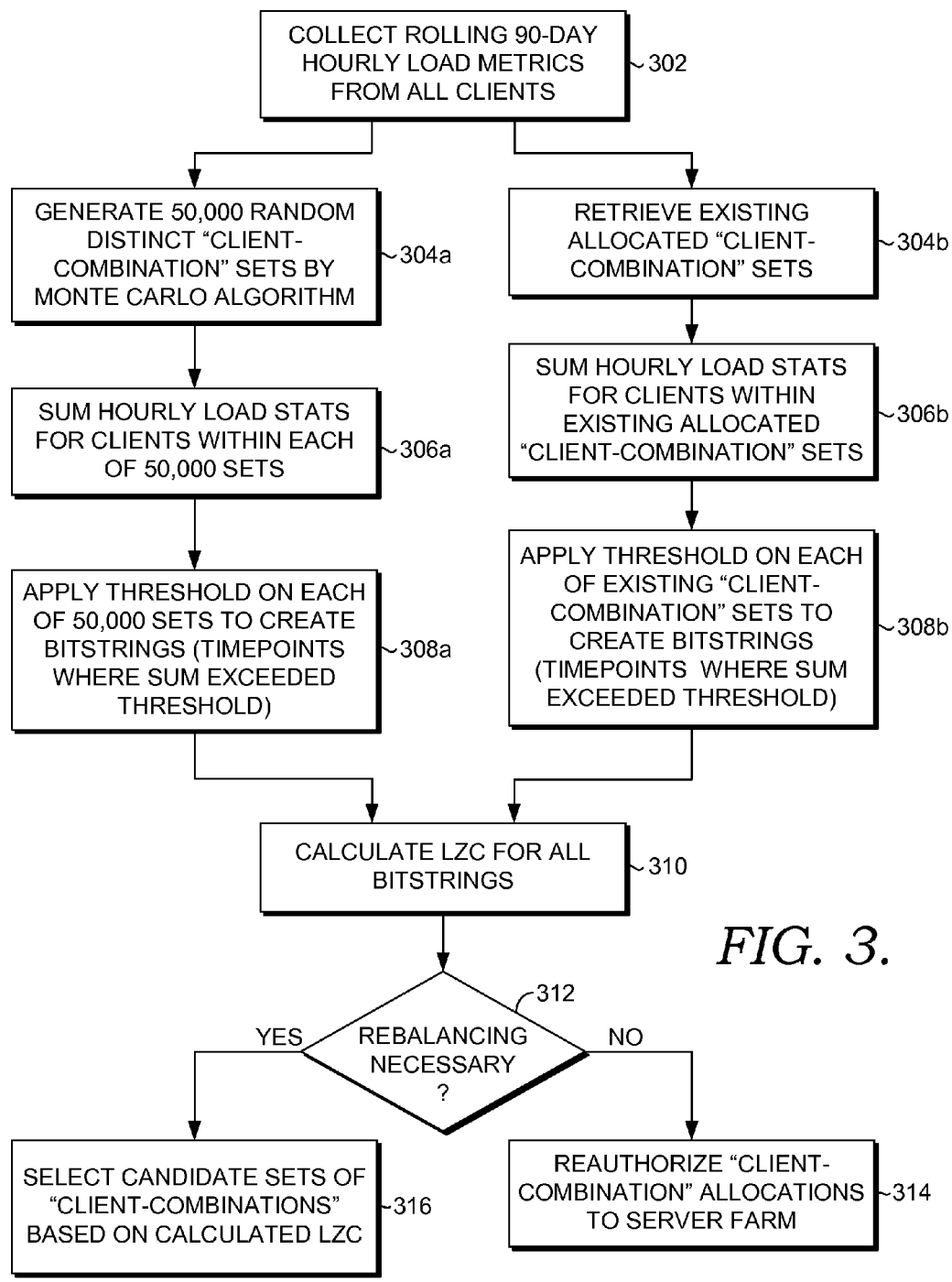
FIG. 3 is a flow diagram showing a method for selecting optimal client-sets and allocating client-sets to resources-sets in accordance with an embodiment of the present invention.

Turning now to FIG. 3, a flow diagram is provided that illustrates a method 300 for selecting optimal client-sets and allocating client-sets to resources-sets in accordance with an embodiment of the present invention. It should be readily understood by one of skill in the art that the particular time period for collecting load metrics (i.e., 90-day) and the number of random "client-combination" sets generated (i.e., 50,000) shown in the flow steps of FIG. 1 are exemplary, and other values may be selected as a matter of design choice.

Initially, as shown at block 302, the detailed load and resource-utilization metrics are collected for each client-source of resource-demand. These metrics are retrieved for the applicable time-interval from the relevant system monitor subsystems and the logfiles that capture and maintain date-timestamped records of the incident load, the associated percent capacity utilization as a function of time attributable to that load, and response-time and other SLA metrics that prevailed for each measurement time-interval for each client-source.

A random-selection algorithm is used to generate a large number of random unique combinations of client-sources, as shown at block 304a. It is not necessary that the search space be examined exhaustively. Indeed, if the number of client-sources N is large and the number of client-sources that can be combined R at a time is also large, then the number of possible combinations $_NC_R$ of N items taken R at a time may be too large a number to examine exhaustively. Combinations can be calculated by any of a variety of methods known to those practiced in the art (such as, for example, the algorithm in the C language function located in Appendix A) and members from this set are then randomly chosen by Monte Carlo or other suitable method capable of broadly sampling in an unbiased manner from the available very number of possible selections. In embodiments with routinely occurring values for N and R and a very large plurality of combinations that is too large to examine exhaustively, it may be sufficient to randomly sample and examine a reasonably large number of combinations that is representative of the search space of possible combinations, in order to discover near-optimal combinations. In other words, practical embodiments of this invention aim to identify 'good' combinations without undertaking the impractically large task of identifying and guaranteeing a 'perfect' globally-optimal combination.

In some embodiments, the application mix and business rules associated with the clients in each client-set are evaluated to determined in the client-set is feasible. If the application mix and business rules of all clients are compatible, the client-set is considered as being feasible and may be further evaluated. Alternatively, if the application mix and business rules of a client is not compatible with the application mix and business rules of other clients in a client-set, that client may be removed from the client-set.

As shown at block 306a, each randomly selected combination constitutes a 'virtual client-set' whose members' historical resource-utilization metrics from a particular time period are summed, representing the load that such a virtual client-set would have presented to the RHO servers had the virtual client-set been instantiated as a real client-set combination during the monitoring time-interval from which the metrics data came.

The summation of the loads for each client-set is compared at block 308a with the available resources on the server(s) to which such a client-set would have been allocated had the client-set been 'real' instead of 'virtual'. In some instances, the available resources may correspond with the resources used by each client in the client-set during the particular time period from which historical resource-utilization metrics were obtained. In some embodiments, a number of unique combinations of server resources may be defined as resource-sets, and the loads of client-sets may be compared against the resource capacities of the generated resource-sets such that the available resources used in the comparisons differ in capacity and configuration from the actual resources used by at least some clients during the particular time period.

For each time-period in which a given summated, aggregated client-set's load exceeded a threshold transgressing an SLA service agreement provision, the bit representing that time-period in a bitstring or one-dimensional array is set equal to '1'. For each time-period in which a client-set's load conformed to the SLA service terms in effect, the bit representing that time-period is set equal to '0'.

As shown at block 304b, existing allocated client-combination sets are retrieved. The historical resource-utilization metrics for each of the client-sets are summed at block 306b, representing the load that each client-set presented to the RHO servers during the monitoring time-interval from which the metrics data came. At block 308b, the summation of the loads for each existing client-set is compared with the available resources on the server(s) which each client-set was allocated. For each time-period in which a given summated, aggregated client-set's load exceeded a threshold transgressing an SLA service agreement provision, the bit representing that time-period in a bitstring or one-dimensional array is set equal to '1'. For each time-period in which a client-set's load conformed to the SLA service terms in effect, the bit representing that time-period is set equal to '0'.

At block 310, the Lempel-Ziv complexity (LZC) is calculated for each such virtual and existing client-set bitstring. This can be accomplished by an algorithm such as the one provided in Appendix B or by other means that implement the definition of LZC. The set of random client-set combinations and their associated LZCs is stored in a suitable database, optionally replacing the stored set of combinations and LZCs from prior period(s) (i.e., after moving through steps 304b, 306b, and 308b as shown in FIG. 3). One skilled in the art will recognize that other objective functions may be employed as an alternative to LZC.

In step 312, a determination is made as to whether rebalancing of assignments of client-sources and loads to available servers is warranted. Accordingly, if no rebalancing of assignments of client-sources and loads to available servers is warranted, then the method ends at step 314 with reauthorization of the existing client-sets to the server farm. If, however, rebalancing to achieve better conformance to SLA terms, or improved economies with a given expenditure for online resources, or other goals is justified, then the database record of random client-set combinations and associated LZCs is examined, in step 316, to select optimal client-sets and allocations of client-sets to resource sets. In some embodiments, the method identifies candidates whose LZC value is greater than 2 but, preferably, less than 10 or, more preferably, less than 6. In some embodiments, the managers who are responsible for overseeing allocation of clients to servers, for example, inspect the resulting list to ascertain which of the low-LZC possible client-set combinations are feasible to undertake and which combinations are not feasible, owing to marked differences in client-organizational policy, legal jurisdiction, terms and conditions of the per-client SLA agreements and the like. Minimum LZC client-set combinations that are deemed feasible to implement in a manner that complies with SLA agreements in force are authorized. Reallocations of new client-sets to servers are implemented, and the affected client organizations are notified, if applicable.

Exemplary System Implementation

The developed Lempel-Ziv algorithm can be incorporated into an IBM WEBSPHERE environment. A WEBSPHERE component known as the placement controller receives dynamic information about the load-related and load-unrelated requirements of the various software applications, and the load-independent and load-dependent capacities of the various servers and component subsystems. Disk and network I/Os per second, memory size and CPU cycles/sec. for example, can be used as the representative resource utilization parameters, respectively. The placement controller is aware of the configuration, i.e., the mapping of applications onto servers in a given WEBSPHERE cell. Upon need, or periodically, the placement controller receives the updated optimal assignments determined by the developed Lempel-Ziv algorithm. Then the placement controller executes the changes, automatically or in a supervised mode, through programmatic steps such as running scripts to start and stop applications servers or to change the binding of certain client organizations to specific resource-sets. Such resource-set bindings constitute virtual or 'logical' client-sets.

The system utilizes historical information regarding the offered load to produce a workload prediction for each application supported by the server farm. For instance, the workload prediction can be characterized by the arrival rate of requests to a given application. Similar to the application workload predictor, the application profiler produces a set of application resource requirements by estimating the amount of server resources required by a single request of each application. The application resource requirements include, for example, the number of CPU cycles required to process a request.

As can be understood, the present invention provides for optimal allocation of clients to client-sets, resources to resource-sets, and client-sets to resource-sets. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

APPENDIX A

```
//===========================================================
// combination.h
// template classes to generate combinations
//    (checkpoint after nend iterations or use
//    monte carlo random sampling to cover searchspace)
//===========================================================
#ifndef ___COMBINATION_H___
#define ___COMBINATION_H___
namespace stdcomb
{// Recursive template function
template <class RanIt, class Func>
void recursive_combination(
            RanIt nbegin,
            RanIt nend,
            int n_column,
            RanIt rbegin,
            RanIt rend,
            int r_column,
            int loop,
            Func func)
{           int r_size=rend-rbegin;
            int localloop=loop;
            int local_n_column=n_column;
            //A different combination is out
            if(r_column>(r_size-1))
            {   func(rbegin,rend);
    return;     }
            for(int i=0;i<=loop;++i)
            {       RanIt it1=rbegin;
                for(int cnt=0;cnt<r_column;++cnt)
                {           ++it1;      }
                RanIt it2=nbegin;
                for(int cnt2=0;cnt2<n_column+i;++cnt2)
```

APPENDIX A-continued

```
                                    {                     ++it2;          }
                                    *it1=*it2;
                                    ++local_n_column;
                                    recursive_combination(nbegin,nend,local_n_column,
                                          rbegin,rend,r_column+1,localloop,func);
                                    --localloop;   }}
// Non recursive template function 1a – next
template <class BidIt>
inline bool next_combination(
                    BidIt n_begin,
                    BidIt n_end,
                    BidIt r_begin,
                    BidIt r_end)
{ bool boolmarked=false;
    BidIt r_marked;
    BidIt n_it1=n_end;
    --n_it1;
    BidIt tmp_r_end=r_end;
    --tmp_r_end;
    for(BidIt r_it1=tmp_r_end; r_it1!=r_begin || r_it1==r_begin; --r_it1,--n_it1)
    {   if(*r_it1==*n_it1 )
        {   if(r_it1!=r_begin) //to ensure not at the start of r sequence
            {           boolmarked=true;
                r_marked=(--r_it1);
                ++r_it1;//add it back again
                continue;   }
            else // it means it is at the start the sequence, so return false
                return false;          }
        else//if(*r_it1!=*n_it1 )
        {   //marked code
            if(boolmarked==true)
            {           //for loop to find which marked is in the first sequence
                BidIt n_marked;//mark in first sequence
                for (BidIt n_it2=n_begin;n_it2!=n_end;++n_it2)
                    if(*r_marked==*n_it2) {n_marked=n_it2;break;}
                BidIt n_it3=++n_marked;
                for (BidIt r_it2=r_marked;r_it2!=r_end;++r_it2,++n_it3)
                {           *r_it2=*n_it3;         }
                return true;           }
            for(BidIt n_it4=n_begin; n_it4!=n_end; ++n_it4)
                if(*r_it1==*n_it4)
                {           *r_it1=*(++n_it4);
                    return true;                 }  } }
    return true;   }
// Non recursive template function 1b – next with Pred
template <class BidIt, class Prediate>
inline bool next_combination(
                    BidIt n_begin,
                    BidIt n_end,
                    BidIt r_begin,
                    BidIt r_end,
                    Prediate Equal)
{ bool boolmarked=false;
    BidIt r_marked;
    BidIt n_it1=n_end;
    --n_it1;
    BidIt tmp_r_end=r_end;
    --tmp_r_end;
        for(BidIt r_it1=tmp_r_end; r_it1!=r_begin || r_it1==r_begin; --r_it1,--n_it1)
    {   if(Equal( *r_it1, *n_it1) )
        {   if(r_it1!=r_begin) //to ensure not at the start of r sequence
            {           boolmarked=true;
                r_marked=(--r_it1);
                ++r_it1;//add it back again
                continue;   }
            else // it means it is at the start the sequence, so return false
                return false;          }
        else //if(*r_it1!=*n_it1 )
        {   //marked code
            if(boolmarked==true)
            {           //for loop to find which marked is in the first sequence
                BidIt n_marked;//mark in first sequence
                for (BidIt n_it2=n_begin;n_it2!=n_end;++n_it2)
                    if( Equal( *r_marked, *n_it2) ) {n_marked=n_it2;break;}
                BidIt n it3=++n_marked;
                for (BidIt r_it2=r_marked;r_it2!=r_end;++r_it2,++n_it3)
                {           *r_it2=*n_it3;         }
                return true;   }
```

APPENDIX A-continued

```
                    for(BidIt n_it4=n_begin; n_it4!=n_end; ++n_it4)
                        if( Equal(*r_it1, *n_it4) )
                        {      *r_t1=*(++n_it4);
                               return true;            }  } }
      return true;}
// Non recursive template function 2a - prev
template <class BidIt>
inline bool prev_combination(
                BidIt n_begin,
                BidIt n_end,
                BidIt r_begin,
                BidIt r_end)
{ bool boolsame=false;
    BidIt marked;//for r
    BidIt r_marked
    BidIt n_marked;
    BidIt tmp_n_end=n_end;
    --tmp_n_end
    BidIt r_it1=r_end;
    --r_it1;
    for(BidIt n_it1=tmp_n_end; n_it1!=n_begin || n_it1==n_begin ; --n_it1)
    {  if(*r_it1==*n_it1)
        {   r_marked=r_it1;
            n_marked=n_it1;
            break   } }
    BidIt n_it2=n_marked;
    BidIt tmp_r_end=r_end;
    --tmp_r_end;
    for(BidIt r_it2=r_marked; r_it2!=r_begin || r_it2==r_begin; --r_it2,--n_it2)
    {  if(*r_it2==*n_it2 )
        {  if(r_it2==r_begin&& !(*r_it2==*n_begin) )
            {      for(BidIt n_it3=n_begin;n_it3!=n end;++n_it3)
                {      if(*r_it2==*n_it3)
                    {      marked=r_it2;
                         *r_it2=*(--n_it3);
                           BidIt n_it4=n_end;
                           --n_it4;
                           for(BidIt r_it3=tmp_r_end; (r_it3!=r_begin || r_it3==r_begin) &&r_it3!=marked; --r_it3,--n_it4)
                    {      *r_it3=*n_it4;            }
                           return true;       }    }  }
            else if(r_it2==r_begin&&*r_it2==*n_begin)
            {      return false;//no more previous combination;        }  }
        else//if(*r_it2!=*n_it2 )
        {      ++r_it2;
            marked=r_it2;
            for(BidIt n_it5=n_begin;n_it5!=n_end;++n_it5)
                {      if(*r_it2==*n_it5)
                    {      *r_it2=*(--n_it5);
                           BidIt n_it6=n_end;
                           --n_it6;
                           for(BidIt r_it4=tmp_r_end; (r_it4!=r_begin || r_it4==r_begin) &&r_it4!=marked; --r_it4,--n_it6)
                    {      *r_it4=*n_it6;            }
                           return true;       } } }
      return false;//Will never reach here, unless error   }
// Non recursive template function 2b - prev with Pred
template <class BidIt, class Prediate>
inline bool prev_combination(
                BidIt n_begin,
                BidIt n_end,
                BidIt r_begin,
                BidIt r_end,
                Prediate Equal)
{ bool boolsame=false;
    BidIt marked;
    BidIt r_markded;
    BidIt n_marked;
    BidIt tmp_n_end=n_end;
    --tmp n_end;
    BidIt r_it1=r_end;
    --r_it1;
    for(BidIt n_it1=tmp_n_end; n_it1!=n_begin || n_it1==n_begin ; --n_it1)
    {   if( Equal(*r_it1, *n_it1) )
        {   r_marked=r_it1;
            n_marked=n_it1;
            break;  } }
    BidIt n_it2=n_marked;
    BidIt tmp_r_end=r_end;
    --tmp_r_end;
```

APPENDIX A-continued

```
        for(BidIt r_it2=r_marked; r_it2!=r_begin || r_it2==r_begin; --r_it2,--n_it2)
        {   if( Equal(*r_it2, *n_it2) )
            {   if(r_it2==r_begin&& !Equal(*r_it2, *n_begin) )
                {       for(BidIt n_it3=n_begin;n_it3!=n_end;++n_it3)
                    {       if(Equal(*r_it2, *n_it3))
                        {           marked=r_it2;
                            *r_it2=*(--n_it3);
                            BidIt n_it4=n_end;
                            --n_it4;
                            for(BidIt r_it3=tmp_r_end; (r_it3!=r_begin || r_it3==r_begin) &&r_it3!=marked; --r_it3,-
                                    -n_it4)
                            {       *r_it3=*n_it4;          }
                            return true;        }       }   }
                else if(r_it2==r_begin&&Equal(*r_it2, *n_begin))
                {       return false;       }   }
            else //if(*r_it2!=*n_it2 )
            {       ++r_it2;
                marked=r_it2;
                for(BidIt n_it5=n_begin;n_it5!=n_end;++n_it5)
                {       if(Equal(*r_it2, *n_it5))
                    {       *r_it2=*(--n_it5);
                        BidIt n_it6=n_end;
                        --n_it6;
                        for(BidIt r_it4=tmp_r_end; (r_it4!=r_begin || r_it4==r_begin) &&r_it4!=marked; --r_it4,--
                                n_it6)
                        {       *r_it4=*n_it6;          }
                        return true;        }   }   }
        return false;//Will never reach here, unless error      }}
#endif
```

APPENDIX B

```
lz.h
//==========================================================
// lz.h
// template class to compute Lempel-Ziv Complexity
//    of bitstrings of arbitrary length
//==========================================================
#ifndef ___LZ_H___
#define ___LZ_H___
namespace stdlz
{// Lempel-Ziv Complexity function
template <class CidIt>
inline int substring(
        char *s,
        int r,
        int i)
{ int j;
    for(j=0; j<=r; j++)
        if(strncmp(s+r+1,s+j,i) == 0) return 1;
    return 0;}
inline int complexity(char *s)
{ static char *laststring = "";
static int c, r;
int n = strlen(s);
int i;
if(n == 0) return 0;
if(r == n-1 ) return c;
if(laststring != s) { c = 1; r = 0; }
laststring = s;
for(i=1; i < n-r; i++)
    if(!substring(s,r,i))
    {   c++;
    r+=i;
    return complexity(s); }
return ++c;}}
#endif
```

What is claimed is:

1. A method of network resource allocation, comprising:

collecting resource consumption measurements of a plurality of back-end server devices, wherein each back-end server device is allocated to at least one of a plurality of client devices to form a plurality of existing server-client combinations to process requests from the plurality of client devices;

determining whether the resource consumption measurements of each existing server-client combination during a first time period meets a service level agreement requirement;

calculating an existing server-client combination bitstring based on whether the resource consumption measurements of each existing server-client combinations meets the service level agreement requirement;

creating possible server-client combinations comprising random unique combinations of each of the back-end server devices and the client devices excluding the existing server-client combinations;

determining a possible server-client load for each of the possible server-client combinations based on the resource consumption measurements collected during the first time period;

determining whether the possible server-client load of each for the possible server-client combinations meets the service level agreement requirement;

calculating a possible server-client combination bitstring based on whether the possible server-client load of each possible server-client combination meets the service level agreement requirement; and reallocating each back-end server device to at least one client device based on the existing server-client combination bitstring and the possible server-client combination bitstring when the resource consumption measurement of each existing server-client combination does not meet a service level agreement requirement and when the possible server-client load for each of the possible server-client combinations meets the service level agreement requirement.

2. The method of claim 1, wherein determining whether the resource consumption measurements of each server-client combination during a first time period meets a service-level agreement requirement further comprises:

summing the resource consumption measurements collected during the first time period for each server-client combination; and determining whether the summed resource consumption measurements for each server-client combination meets the service level agreement requirement.

3. The method of claim 1, wherein creating possible server-client combinations further comprises:

determining whether an application mix and business rules of all of the client devices in one of the possible server-client combinations are compatible; and when the application mix and the business rules are not compatible, removing the one of the possible server-client combinations from the possible server-client combinations.

4. The method of claim 1, wherein determining whether the possible server-client load for each of the possible server-client combinations meets the service level agreement requirement further comprises:

summing the possible server-client load of each of the possible server-client combinations during the first time period; and determining whether the summed possible server-client set load for each of the possible server-client combinations meets the service level agreement requirement.

5. The method of claim 1, wherein calculating an existing server-client combination bitstring further comprises calculating a Lempel-Ziv complexity for each existing server-client combination bitstring.

6. The method of claim 1, wherein calculating a possible server-client combination bitstring further comprises calculating a Lempel-Ziv complexity for each possible server-client combination bitstring.

7. The method of claim 1, wherein reallocating each back-end server to at least one client is further based on a Lempel-Ziv complexity for each existing server-client combination bitstring and a Lempel-Ziv complexity for each possible server-client combination bitstring.

8. A system for network resource allocation, comprising:

a controller configured to collect resource consumption measurements of a plurality of back-end server devices, wherein each back-end server device is allocated to at least one of a plurality of client devices to form a plurality of existing server-client combinations to process requests from the plurality of client devices;

determine whether the resource consumption measurements of each existing server-client combination during a first time period meets a service level agreement requirement;

calculate an existing server-client combination bitstring based on whether the resource consumption measurements of each existing server-client combinations meets the service level agreement requirement;

create possible server-client combinations comprising random unique combinations of each of the back-end server devices and the client devices excluding the existing server-client combinations;

determine a possible server-client load for each of the possible server-client combinations based on the resource consumption measurements collected during the first time period;

determine whether the possible server-client load of each for the possible server-client combinations meets the service level agreement requirement;

calculate a possible server-client combination bitstring based on whether the possible server-client load of each possible server-client combination meets the service level agreement requirement; and reallocate each back-end server device to at least one client device based on the existing server-client combination bitstring and the possible server-client combination bitstring when the resource consumption measurement of each existing server-client combination does not meet a service-level agreement requirement and when the possible server-client load for each of the possible server-client combinations meets the service level agreement requirement.

9. The system of claim 8, wherein the controller is further configured to:

sum the resource consumption measurements collected during the first time period for each server-client combination; and determine whether the summed resource consumption measurements for each server-client combination meets the service level agreement requirement.

10. The system of claim 8, wherein the controller is further configured to:

determine whether an application mix and business rules of all of the client devices in one of the possible server-client combinations are compatible; and when the application mix and the business rules are not compatible, remove the one of the possible server-client combinations from the possible server-client combinations.

11. The system of claim 8, wherein the controller is further configured to:

sum the possible server-client load of each of the possible server-client combinations during the first time period; and determine whether the summed possible server-client set load for each of the possible server-client combinations meets the service level agreement requirement.

12. The system of claim 8, wherein the controller is further configured to calculate an existing server-client combination bitstring further comprises calculating a Lempel-Ziv complexity for each existing server client combination bitstring.

13. The system of claim 8, wherein the controller is further configured to calculate a possible server-client combination bitstring further comprises calculating a Lempel-Ziv complexity for each possible server-client combination bitstring.

14. The system of claim 8, wherein the controller is further configured to reallocate each back-end server to at least one client is further based on a Lempel-Ziv complexity for each existing server client combination bitstring and a Lempel-Ziv complexity for each possible server-client combination bitstring.

* * * * *